US011508992B2

(12) United States Patent
Ha et al.

(10) Patent No.: US 11,508,992 B2
(45) Date of Patent: Nov. 22, 2022

(54) RECHARGEABLE LITHIUM BATTERY

(71) Applicant: Samsung SDI Co., Ltd., Yongin-si (KR)

(72) Inventors: Jaehwan Ha, Yongin-si (KR); Kijun Kim, Yongin-si (KR); Heeeun Yoo, Yongin-si (KR); Yeonhee Yoon, Yongin-si (KR); Kyuseo Lee, Yongin-si (KR); Dongmyung Lee, Yongin-si (KR)

(73) Assignee: Samsung SDI Co. Ltd., Yongin-si (KR)

( * ) Notice: Subject to any disclaimer, the term of this patent is extended or adjusted under 35 U.S.C. 154(b) by 178 days.

(21) Appl. No.: 16/863,679

(22) Filed: Apr. 30, 2020

(65) Prior Publication Data
US 2020/0350632 A1 Nov. 5, 2020

(30) Foreign Application Priority Data

May 3, 2019 (KR) .................. 10-2019-0052568

(51) Int. Cl.
*H01M 4/00* (2006.01)
*H01M 10/0569* (2010.01)
(Continued)

(52) U.S. Cl.
CPC ....... *H01M 10/0569* (2013.01); *H01M 4/131* (2013.01); *H01M 4/366* (2013.01);
(Continued)

(58) Field of Classification Search
CPC .. H01M 4/382; H01M 10/0525; H01M 4/661; H01M 4/133; H01M 4/587; H01M 2004/028
See application file for complete search history.

(56) References Cited

U.S. PATENT DOCUMENTS 5,582,931 A * 12/1996 Kawakami ........ H01M 10/0413
429/162
6,391,495 B1 5/2002 Choi et al.
(Continued)

FOREIGN PATENT DOCUMENTS

CN 1246736 3/2000
CN 1286507 3/2001
(Continued)

OTHER PUBLICATIONS

Office Action dated Nov. 9, 2021, issued to European Patent Application No. 19183919.0.
(Continued)

*Primary Examiner* — Cynthia H Kelly
*Assistant Examiner* — Monique M Wills
(74) *Attorney, Agent, or Firm* — H.C. Park & Associates, PLC

(57) ABSTRACT

Rechargeable lithium battery includes a negative electrode including a negative active material layer and a negative electrode functional layer disposed on the negative active material layer; a positive electrode including a positive active material; an electrolyte solution, wherein the negative electrode functional layer includes flake-shaped polyethylene particles, the electrolyte solution includes a lithium salt and a non-aqueous organic solvent, and the non-aqueous organic solvent includes about 60 volume % to about 80 volume % of a propionate-based solvent and about 20 volume % to about 40 volume % of a carbonate-based solvent.

20 Claims, 4 Drawing Sheets

(51) Int. Cl.
*H01M 4/131* (2010.01)
*H01M 4/36* (2006.01)
*H01M 4/505* (2010.01)
*H01M 4/525* (2010.01)
*H01M 4/62* (2006.01)
*H01M 10/0525* (2010.01)
*H01M 10/0567* (2010.01)
*H01M 4/02* (2006.01)

(52) U.S. Cl.
CPC ........... *H01M 4/505* (2013.01); *H01M 4/525* (2013.01); *H01M 4/621* (2013.01); *H01M 10/0525* (2013.01); *H01M 10/0567* (2013.01); *H01M 2004/021* (2013.01); *H01M 2004/027* (2013.01); *H01M 2004/028* (2013.01)

(56) References Cited

U.S. PATENT DOCUMENTS

| | | |
|---|---|---|
| 6,465,125 B1 | 10/2002 | Takami et al. |
| 6,475,678 B1 | 11/2002 | Suzuki |
| 6,511,517 B1 | 1/2003 | Ullrich et al. |
| 6,511,776 B1 | 1/2003 | Ryuji et al. |
| 10,476,082 B2 | 11/2019 | Jang et al. |
| 10,756,352 B2 | 8/2020 | Yoon et al. |
| 2001/0041289 A1 | 11/2001 | Hikmet et al. |
| 2002/0004169 A1 | 1/2002 | Yamada et al. |
| 2005/0079422 A1 | 4/2005 | Ko et al. |
| 2005/0221165 A1 | 10/2005 | Hennige et al. |
| 2005/0287442 A1 | 12/2005 | Kim et al. |
| 2006/0099495 A1 | 5/2006 | Suzuki et al. |
| 2007/0057228 A1 | 3/2007 | Huang et al. |
| 2007/0264577 A1 | 11/2007 | Katayama et al. |
| 2008/0241864 A1 | 10/2008 | Muraoka et al. |
| 2008/0292965 A1 | 11/2008 | Kubota et al. |
| 2009/0067119 A1 | 3/2009 | Katayama et al. |
| 2009/0253043 A1 | 10/2009 | Bak |
| 2010/0248026 A1 | 9/2010 | Hinoki et al. |
| 2011/0003209 A1 | 1/2011 | Katayama et al. |
| 2011/0062378 A1 | 3/2011 | Chang et al. |
| 2012/0321948 A1 | 12/2012 | Oya et al. |
| 2013/0089794 A1 | 4/2013 | Kim et al. |
| 2013/0236790 A1 | 9/2013 | Byun |
| 2013/0288093 A1 | 10/2013 | Nakagiri et al. |
| 2013/0335030 A1 | 12/2013 | Joe et al. |
| 2013/0337301 A1 | 12/2013 | Joe et al. |
| 2013/0346000 A1 | 12/2013 | Joe et al. |
| 2014/0014027 A1 | 1/2014 | Bischoff et al. |
| 2014/0138591 A1 | 5/2014 | Yoon et al. |
| 2014/0272489 A1 | 9/2014 | Anandan et al. |
| 2014/0322600 A1 | 10/2014 | Morita et al. |
| 2015/0050533 A1 | 2/2015 | Nam et al. |
| 2015/0221452 A1 | 8/2015 | Iida et al. |
| 2016/0104880 A1 | 4/2016 | Gao et al. |
| 2016/0141579 A1 | 5/2016 | Seok et al. |
| 2016/0268558 A1 | 9/2016 | Sawayama et al. |
| 2016/0285101 A1 | 9/2016 | Yoshio et al. |
| 2016/0322636 A1 | 11/2016 | Lee et al. |
| 2016/0351885 A1 | 12/2016 | Umehara |
| 2017/0170481 A1 | 6/2017 | Jang et al. |
| 2017/0187022 A1 | 6/2017 | Isozaki et al. |
| 2017/0229731 A1 | 8/2017 | Visco et al. |
| 2017/0288257 A1 | 10/2017 | Kil et al. |
| 2018/0040899 A1 | 2/2018 | Kuzuoka et al. |
| 2018/0083312 A1 | 3/2018 | Shiu et al. |
| 2018/0097218 A1 | 4/2018 | Komura |
| 2018/0145333 A1 | 5/2018 | Tokune et al. |
| 2018/0191027 A1 | 7/2018 | Ohara et al. |
| 2018/0294516 A1 | 10/2018 | Huang et al. |
| 2018/0331342 A1 | 11/2018 | Honda et al. |
| 2018/0375158 A1* | 12/2018 | Morinaka ........... H01M 10/052 |
| 2019/0123352 A1 | 4/2019 | Ko et al. |
| 2019/0123356 A1 | 4/2019 | Ko et al. |
| 2019/0140283 A1 | 5/2019 | Fukatani et al. |
| 2019/0229325 A1 | 7/2019 | Ahn et al. |
| 2019/0334157 A1 | 10/2019 | Seok et al. |
| 2019/0355952 A1 | 11/2019 | Yoon et al. |
| 2019/0383465 A1* | 12/2019 | Van Der Sijde ... G02B 19/0066 |
| 2020/0014027 A1 | 1/2020 | Ha et al. |
| 2020/0014078 A1 | 1/2020 | Ha et al. |
| 2020/0075955 A1 | 3/2020 | Jeon et al. |
| 2020/0127257 A1 | 4/2020 | Lee et al. |
| 2020/0194784 A1 | 6/2020 | Lee et al. |
| 2020/0350557 A1 | 11/2020 | Ha et al. |
| 2020/0350566 A1 | 11/2020 | Ha et al. |
| 2020/0350567 A1 | 11/2020 | Ha et al. |
| 2020/0350568 A1 | 11/2020 | Lee et al. |
| 2020/0350574 A1 | 11/2020 | Ha et al. |
| 2020/0350580 A1 | 11/2020 | Ha et al. |
| 2021/0074967 A1 | 3/2021 | Kim et al. |
| 2021/0074971 A1 | 3/2021 | Kim et al. |
| 2021/0074972 A1 | 3/2021 | Kim et al. |
| 2021/0074975 A1 | 3/2021 | Kwak et al. |
| 2021/0074979 A1 | 3/2021 | Kwak et al. |
| 2021/0074980 A1 | 3/2021 | Kim et al. |

FOREIGN PATENT DOCUMENTS

| | | |
|---|---|---|
| CN | 101048892 | 10/2007 |
| CN | 101783417 | 7/2010 |
| CN | 101847709 | 9/2010 |
| CN | 101478042 | 12/2010 |
| CN | 102280614 | 12/2011 |
| CN | 104393267 | 3/2015 |
| CN | 104466186 | 3/2015 |
| CN | 105977447 | 9/2016 |
| CN | 106843383 | 6/2017 |
| CN | 111883815 | 11/2020 |
| CN | 111883816 | 11/2020 |
| CN | 111883819 | 11/2020 |
| EP | 1079455 | 2/2001 |
| EP | 1826842 | 8/2007 |
| EP | 2581977 | 4/2013 |
| EP | 2838142 | 2/2015 |
| EP | 2874215 | 5/2015 |
| EP | 3024063 | 5/2016 |
| EP | 3386003 | 10/2018 |
| JP | 2000-277148 | 10/2000 |
| JP | 2001-135359 | 5/2001 |
| JP | 2004-111157 | 4/2004 |
| JP | 2005-123185 | 5/2005 |
| JP | 2008-305783 | 12/2008 |
| JP | 4977079 | 7/2012 |
| JP | 2012-221672 | 11/2012 |
| JP | 5110670 | 7/2014 |
| JP | 2015-115168 | 6/2015 |
| JP | WO2014-103792 | 1/2017 |
| JP | 6197384 | 9/2017 |
| JP | 6271709 | 1/2018 |
| JP | 2018-106879 | 7/2018 |
| JP | 2018-147672 | 9/2018 |
| JP | 2018-156876 | 10/2018 |
| JP | 2018156876 | 10/2018 |
| JP | 2019-087464 | 6/2019 |
| KR | 10-2000-0056339 | 9/2000 |
| KR | 10-2005-0035074 | 4/2005 |
| KR | 10-2005-0035281 | 4/2005 |
| KR | 10-2005-0121172 | 12/2005 |
| KR | 10-2008-0073371 | 8/2008 |
| KR | 10-2009-0106841 | 10/2009 |
| KR | 10-2010-0081950 | 7/2010 |
| KR | 10-2013-0104088 | 9/2013 |
| KR | 10-2013-0105449 | 9/2013 |
| KR | 10-2013-0116170 | 10/2013 |
| KR | 10-2014-0068893 | 6/2014 |
| KR | 10-2015-0020022 | 2/2015 |
| KR | 10-2015-0050974 | 5/2015 |
| KR | 10-2015-0129181 | 11/2015 |
| KR | 10-2015-0143334 | 12/2015 |
| KR | 10-2016-0024776 | 3/2016 |
| KR | 10-2016-0025052 | 3/2016 |
| KR | 10-2016-0029176 | 3/2016 |
| KR | 10-2016-0066518 | 6/2016 |
| KR | 10-2016-0110076 | 9/2016 |

(56) References Cited

FOREIGN PATENT DOCUMENTS

| | | |
|---|---|---|
| KR | 10-2016-0117689 | 10/2016 |
| KR | 10-2017-0060515 | 6/2017 |
| KR | 10-2017-0094720 | 8/2017 |
| KR | 10-2017-0109285 | 9/2017 |
| KR | 10-2017-0113645 | 10/2017 |
| KR | 10-2018-0014192 | 2/2018 |
| KR | 10-2018-0037121 | 4/2018 |
| KR | 10-2018-0045724 | 5/2018 |
| KR | 10-2018-0049986 | 5/2018 |
| KR | 10-2018-0077190 | 7/2018 |
| KR | 10-2018-0081072 | 7/2018 |
| KR | 10-1876826 | 7/2018 |
| KR | 10-2018-0097036 | 8/2018 |
| KR | 10-2019-0043955 | 4/2019 |
| KR | 10-2019-0043957 | 4/2019 |
| KR | 10-2020-0044579 | 4/2020 |
| WO | 2006-132474 | 12/2006 |
| WO | 2014-103792 | 7/2014 |
| WO | 2018-012821 | 1/2018 |

OTHER PUBLICATIONS

Extended European Search Report dated Aug. 3, 2020, issued to European Patent Application No. 20171859.0.
Extended European Search Report dated Aug. 3, 2020, issued to European Patent Application No. 20171551.3.
Extended European Search Report dated Aug. 3, 2020, issued to European Patent Application No. 20171450.8.
Extended European Search Report dated Aug. 3, 2020, issued to European Patent Application No. 20171833.5.
Extended European Search Report dated Aug. 3, 2020, issued to European Patent Application No. 20171846.7.
Extended European Search Report dated Aug. 3, 2020, issued to European Patent Application No. 20172132.1.
Notice of Refusal dated Mar. 11, 2021, issued to Korean Patent Application No. 10-2018-0160080.
Grant of Patent dated Mar. 25, 2021, issued to Korean Patent Application No. 10-2018-0077138.
Grant of Patent dated Mar. 25, 2021, issued to Korean Patent Application No. 10-2018-0077139.
Office Action dated Apr. 12, 2021, issued to U.S. Appl. No. 16/460,779.
Office Action and Search Report dated Feb. 9, 2022, issued to Chinese Patent Application No. 201910594666.
Office Action dated Feb. 17, 2022, issued to U.S. Appl. No. 16/862,779.
Office Action dated Feb. 17, 2022, issued to U.S. Appl. No. 16/460,765.
Notice of Allowance dated Sep. 2, 2021, issued to Korean Patent Application No. 10-2018-0160080.
Office Action dated Sep. 10, 2021, issued to U.S. Appl. No. 16/460,765.
Office Action dated Sep. 10, 2021, issued to U.S. Appl. No. 16/711,114.
Office Action dated Mar. 4, 2021, issued to U.S. Appl. No. 16/460,765.
Advisory Action and AFCP Decision dated Jan. 6, 2022 issued to U.S. Appl. No. 16/460,779.
Office Action dated Jan. 26, 2022 and Search Reported dated Jan. 21, 2022, issued to Chinese Patent Application No. 201901595050.
Final Office Action dated Oct. 22, 2021, issued to U.S. Appl. No. 16/460,779.
Advisory Action dated Nov. 17, 2021, issued to U.S. Appl. No. 16/460,765.
Extended European Search Report dated Nov. 7, 2019 in European Patent Application No. 19183919.0.
Extended European Search Report dated Nov. 7, 2019 in European Patent Application No. 19183958.8.
Extended European Search Report dated Oct. 19, 2020, issued to European Patent Application No. 20172161.
Non-Final Office Action dated Apr. 1, 2022, issued to U.S. Appl. No. 16/864,384.
Final Office Action dated Dec. 15, 2021, issued to U.S. Appl. No. 16/711,114.
Notice of Allowance dated Mar. 2, 2022, issued to U.S. Appl. No. 16/711,114.
Non-Final Office Action dated May 3, 2022, issued to U.S. Appl. No. 16/864,294.
Non-Final Office Action dated May 12, 2022, issued to U.S. Appl. No. 16/862,866.
Non-Final Office Action dated Apr. 27, 2022, issued to U.S. Appl. No. 16/862,638.
Final Office Action dated Jun. 7, 2022, issued to U.S. Appl. No. 16/862,779.
Non-Final Office Action dated Jun. 28, 2022, issued to U.S. Appl. No. 16/864,858.
Jing Wang, et al., "Thermal Synergy Effect between LiNi0.5Co0.2Mn0.3O2 and LiMn2O4 Enhances the Safety of Blended Cathode for Lithium Ion Batteries", ACS Appl. Mater. Interfaces 2016, 8, pp. 20147-20156 (Jul. 22, 2016).
Notice of Allowance dated Jul. 11, 2022, of Korean Patent Application No. 10-2019-0052572.
Notice of Allowance dated Jul. 11, 2022, of Korean Patent Application No. 10-2019-0052574.
Office Action dated Jul. 13, 2022, of Korean Patent Application No. 10-2019-0052571.
Notice of Allowance dated Jul. 13, 2022, of Korean Patent Application No. 10-2019-0052570.
Office Action dated Jul. 13, 2022, of Korean Patent Application No. 10-2019-0052573.
Notice of Allowance dated Jul. 13, 2022, of U.S. Appl. No. 16/460,779.
Office Action dated Jul. 22, 2022, of European Patent Application No. 20172161.0.
Notice of Allowance dated Aug. 1, 2022, of U.S. Appl. No. 16/864,384.
Office Action dated Aug. 23, 2022, of Chinese.Patent Application No. 201911266005.8.
Notice of Allowance dated Aug. 8, 2022, of U.S. Appl. No. 16/862,638.
Final Office Action dated Aug. 30, 2022, issued to U.S. Appl. No. 16/864,294.
Notice of Allowance dated Aug. 15, 2022, issued to U.S. Appl. No. 16/862,779.
Final Office Action dated Sep. 23, 2022, issued to U.S. Appl. No. 16/460,765.
Notice of Allowance dated Oct. 5, 2022, issued to Korean Patent Application No. 10-2019-0052569.
Notice of Allowance dated Oct. 5, 2022, issued to Korean Patent Application No. 10-2019-0052568.

* cited by examiner

RECHARGEABLE LITHIUM BATTERY

CROSS-REFERENCE TO RELATED APPLICATION

This application claims priority from and the benefit of Korean Patent Application No. 10-2019-0052568 filed on May 3, 2019, which is hereby incorporated by reference for all purposes as if fully set forth herein. Further, two related co-pending applications were filed on Jul. 2, 2019 with United States Patent and Trademark Office, as U.S. patent application Ser. No. 16/460,765 and U.S. patent application Ser. No. 16/460,779, both of which are hereby incorporated by reference for all purposes as if fully set forth herein, but are not admitted to be prior art with respect to the present invention by their mention in the cross-reference section.

BACKGROUND

Field

Exemplary embodiments/implementations of the invention relate generally to a rechargeable lithium battery.

Discussion of the Background

A portable information device such as a cell phone, a laptop, smart phone, and the like or an electric vehicle has used a rechargeable lithium battery having high energy density and easy portability as a driving power source. In addition, research on use of a rechargeable lithium battery as a power source for a hybrid or electric vehicle or a power storage by using high energy density characteristics has recently been actively made.

One of the main research tasks of such a rechargeable lithium battery is to improve the safety of the rechargeable battery. For example, if the rechargeable lithium battery is exothermic due to internal short circuit, overcharge and over-discharge, and the like, electrolyte decomposition and thermal runaway may occur and internal battery pressure may rapidly rise causing an explosion. Among these, when internal short circuit of the rechargeable lithium battery occurs, there is a high risk of explosion because high electrical energy stored in each electrode is conducted through the shorted positive electrode and negative electrode.

Explosion may cause fatal damages to the user. Therefore, it is urgent to improve stability of the rechargeable lithium battery.

The above information disclosed in this Background section is only for understanding of the background of the inventive concepts, and, therefore, it may contain information that does not constitute prior art.

SUMMARY

Devices constructed/methods according to exemplary implementations embodiments of the invention are capable of providing a rechargeable lithium battery having improved stability and improved electrolyte impregnation.

According to one or more implementations/embodiments of the invention, a rechargeable lithium battery includes a negative electrode including a negative active material layer and a negative electrode functional layer disposed on the negative active material layer; a positive electrode including a positive active material; an electrolyte solution, wherein the negative electrode functional layer includes flake-shaped polyethylene particles, the electrolyte solution includes a lithium salt and a non-aqueous organic solvent, and the non-aqueous organic solvent includes about 60 volume % to about 80 volume % of a propionate-based solvent and about 20 volume % to about 40 volume % of a carbonate-based solvent.

The propionate-based solvent may be at least one selected from methyl propionate, ethyl propionate, propyl propionate, and butyl propionate.

The carbonate-based solvent may be at least one selected from ethylene carbonate, propylene carbonate, butylene carbonate, fluoroethylene carbonate, dimethyl carbonate, methyl ethyl carbonate, diethyl carbonate, methylpropyl carbonate, and methylbutyl carbonate.

The electrolyte solution may further include an additive and the additive may be included in an amount of about 3 wt % to about 20 wt % based on a total amount of the electrolyte solution.

The flake-shaped polyethylene particles may have a particle size of about 1 μm to about 8 μm.

A ratio of the long axis length relative to the short axis length of the flake-shaped polyethylene particles may be about 1 to about 5.

The flake-shaped polyethylene particles may have a thickness of about 0.2 μm to about 4 μm.

The negative electrode functional layer may optionally further include inorganic particles and a binder.

A sum amount of the flake-shaped polyethylene particles and an amount of the inorganic particles: the binder may be a weight ratio of about 80:20 to about 99:1.

The flake-shaped polyethylene particles and the inorganic particles may be included in a weight ratio of 95:5 to 10:90.

The negative electrode functional layer may have a thickness of about 1 μm to about 10 μm.

A ratio between thicknesses of the negative active material layer and the negative electrode functional layer may be about 50:1 to about 10:1.

The positive active material layer may include a first positive active material including at least one of a composite oxide of metal selected from cobalt, manganese, nickel, and a combination thereof and lithium, and a second positive active material including a compound represented by Chemical Formula 1:

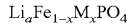

$$Li_aFe_{1-x}M_xPO_4 \qquad \text{[Chemical Formula 1]}$$

wherein 0.90≤a≤1.8, 0≤x≤0.7, and M is Mn, Co, Ni, or a combination thereof.

The first positive active material may include one of $LiCoO_2$, $Li_bM^1_{1-y1-z1}M^2_{y1}M^3_{z1}O_2$ (0.9≤b≤1.8, 0≤y1≤1, 0≤z1≤1, 0≤y1+z1≤1, $M^1$, $M^2$, and $M^3$ are independently a metal of Ni, Co, Mn, Al, Sr, Mg, or La), and a combination thereof.

The second positive active material may include $LiFePO_4$.

The positive active material layer may further include a positive electrode functional layer disposed on the positive active material layer.

The first positive active material may be included in the positive active material layer, and the second positive active material may be included in at least one of the positive active material layer and the positive electrode functional layer.

The first positive active material and the second positive active material may be included in a weight ratio of about 97:3 to about 80:20.

The first positive active material may be included in an amount of about 70 wt % to about 99 wt % based on a total amount of the positive active material layer, and the second positive active material may be included in an amount of about 1 wt % to about 30 wt % based on a total amount of the positive active material layer.

As a reaction rate increases with temperature, an early shut-down function may be implemented, thereby securing stability of the rechargeable lithium battery.

By improving impregnation properties of an electrolyte solution, it is possible to provide a rechargeable lithium battery having improved room temperature and high temperature cycle-life characteristics and high temperature storage characteristics.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
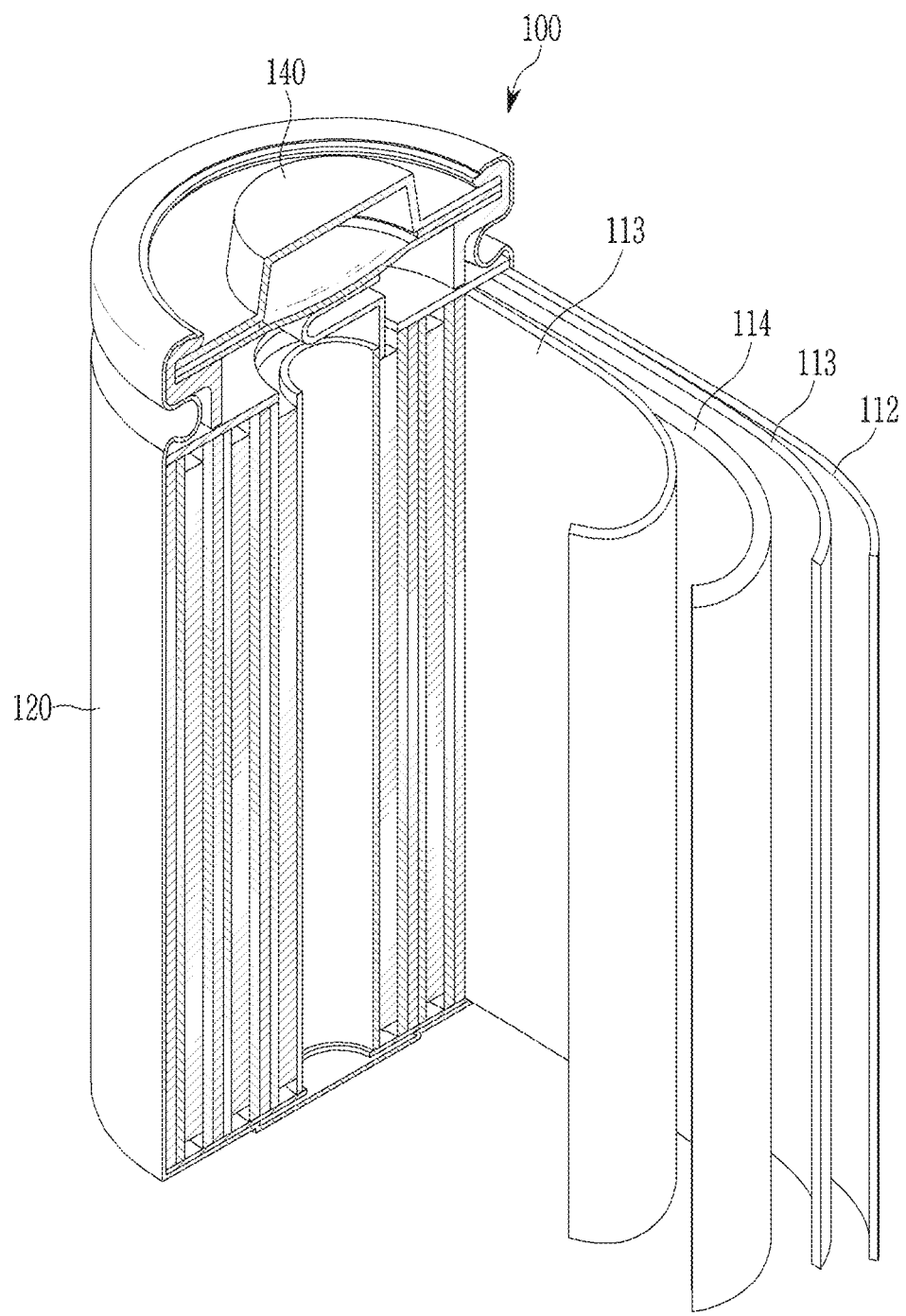
FIG. 1 schematically shows a structure of a rechargeable lithium battery according to an embodiment.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, a rechargeable lithium battery according to an embodiment is described with reference to the drawings. FIG. 1 schematically shows a structure of a rechargeable lithium battery according to an embodiment. In FIG. 1, a cylindrical rechargeable lithium battery as an example of a rechargeable lithium battery, but is not limited thereto, and may have a shape of a square, coin, button, or pouch.

Referring to FIG. 1, a rechargeable lithium battery 100 according to an embodiment includes a battery cell including a negative electrode 112, a positive electrode 114 facing the negative electrode 112, a separator 113 interposed between the negative electrode 112 and the positive electrode 114, and an electrolyte (not shown) for a rechargeable lithium battery impregnating the negative electrode 112, the positive electrode 114, and the separator 113, a battery case 120 configured to accommodate the battery cell, and a sealing member 140 sealing the battery case 120.

The positive electrode includes a positive current collector layer and a positive active material layer disposed on at least one surface of the positive current collector layer.

The positive current collector layer serves to support the positive active materials. As the positive current collector layer, for example, aluminum foil, nickel foil or a combination thereof may be used, but is not limited thereto.

The positive active material layer may include a first positive active material including at least one of a composite oxide of metal selected from cobalt, manganese, nickel, and a combination thereof and lithium, and a second positive active material including a compound represented by Chemical Formula 1:

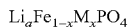

$$\text{Li}_a\text{Fe}_{1-x}\text{M}_x\text{PO}_4 \quad \text{[Chemical Formula 1]}$$

wherein $0.90 \leq a \leq 1.8$, $0 \leq x \leq 0.7$, and M is Mn, Co, Ni, or a combination thereof.

The first positive active material may include one of $\text{LiCoO}_2$, $\text{Li}_b\text{M}^1_{1-y1-z1}\text{M}^2_{y1}\text{M}^3_{z1}\text{O}_2$ ($0.9 \leq b \leq 1.8$, $0 \leq y1 \leq 1$, $0 \leq z1 \leq 1$, $0 \leq y1+z1 \leq 1$, $M^1$, $M^2$, and $M^3$ are independently a metal of Ni, Co, Mn, Al, Sr, Mg, or La), and a combination thereof.

For example, the first positive active material may include $\text{LiCoO}_2$, but is not limited thereto.

For example, $M^1$ may be Ni, and $M^2$ and $M^3$ may independently be a metal such as Co, Mn, Al, Sr, Mg, or La.

More specifically, $M^1$ may be Ni, $M^2$ may be Co, and $M^3$ may be Mn or Al, but is not limited thereto.

The second positive active material may include, for example, $\text{LiFePO}_4$.

The first positive active material may have an average particle diameter of about 10 μm to about 30 μm, specifically about 10 μm to about 25 μm, for example, about 13 μm to about 20 μm. In addition, the second positive active material may have an average particle diameter of about 300 nm to about 700 nm, specifically about 300 nm to about 600 nm, for example, may be about 300 nm to about 500 nm. When the average particle diameters of the first positive active material and the second positive active material are within the above range, energy density may be increased to implement a high capacity of the rechargeable battery.

The rechargeable lithium battery according to an embodiment of the present invention simultaneously has the positive active material layer including the first and second positive active materials along with the negative electrode functional layer disposed on the negative electrode and thus may decrease a heat-increasing rate due to a thermal/physical impact, and the flake-shaped polyethylene particles may be melted and help to completely block ion passages.

According to an embodiment, the positive active material layer may further include a positive electrode functional layer disposed on the positive active material layer.

The first positive active material may be included in the positive active material layer, and the second positive active material may be included in at least one of the positive active material layer and the positive electrode functional layer.

In an embodiment, the first positive active material and the second positive active material may be included in a weight ratio of about 97:3 to about 80:20, for example, may be included in a weight ratio of about 95:5 to about 85:15.

An amount of the first positive active material may be about 70 wt % to about 99 wt %, more specifically, about 85 wt % to about 99 wt %, about 85 wt % to about 95 wt %, or about 85 wt % to about 93 wt % based on a total amount of the positive active material layer.

When the amount of the first positive active material satisfies the above range, safety of a battery may be improved without reducing the capacity.

In addition, an amount of the second positive active material may be about 1 wt % to about 30 wt %, more specifically, about 1 wt % to about 15 wt %, about 5 wt % to about 15 wt %, or about 7 wt % to about 15 wt % based on a total amount of the positive active material layer. When the amount of the second positive active material satisfies the above range, safety of the battery may be improved without reducing the capacity.

The positive active material layer may optionally further include a positive electrode conductive material and a positive electrode binder.

The amounts of the positive electrode conductive material and the positive electrode binder may be about 1 wt % to about 5 wt % based on a total weight of the positive active material layer, respectively.

The positive electrode conductive material is used to impart conductivity to the positive electrode, and types of the positive electrode conductive material are the same as types of the negative electrode conductive material described above.

The positive electrode binder adheres positively to the positive active material particles, and also serves to adhere the positive active materials to the current collector well. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The negative electrode 112 includes a negative current collector, a negative active material layer disposed on the negative current collector, and a negative electrode functional layer disposed on the negative active material layer.

The negative current collector may include one selected from a copper foil, a nickel foil, a stainless steel foil, a titanium foil, a nickel foam, a copper foam, a polymer substrate coated with a conductive metal, and a combination thereof.

The negative active material layer may be disposed on the negative current collector, and may include a negative active material, and optionally a negative electrode conductive material and a negative electrode binder.

The negative active material may include a material that reversibly intercalates/deintercalates lithium ions, a lithium metal, a lithium metal alloy, a material capable of doping/dedoping lithium, or a transition metal oxide.

Examples of the material capable of reversibly intercalating/deintercalating the lithium ions may include a carbonaceous material, that is, a carbon-based negative active material generally used in a rechargeable lithium battery. Examples of the carbon-based negative active material may be crystalline carbon, amorphous carbon, or a combination thereof. The crystalline carbon may be graphite such as non-shaped, sheet-shaped, flake-shaped, spherical shape, or fiber shaped natural graphite or artificial graphite, and the amorphous carbon may be a soft carbon, a hard carbon, a mesophase pitch carbonization product, fired coke, and the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a silicon-based material or a stannum-based material, for example, Si, $SiO_x$ (0<x<2), a Si-Q alloy (wherein Q is an element selected from an alkali metal, an alkaline-earth metal, a Group 13 element, a Group 14 element, a Group 15 element, a Group 16 element, a transition metal, a rare earth element, and a combination thereof, but not Si), a Si-carbon composite, Sn, $SnO_2$, a Sn—R alloy (wherein R is an element selected from an alkali metal, an alkaline-earth metal, a Group 13 element, a Group 14 element, a Group 15 element, a Group 16 element, a transition metal, a rare earth element, and a combination thereof, but not Sn), a Sn-carbon composite, and the like. At least one of these materials may be mixed with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, and a combination thereof.

The transition metal oxide may include a lithium titanium oxide.

In the negative active material layer, an amount of the negative active material about 95 wt % to about 99 wt % based on a total amount of the negative active material layer.

The negative active material layer may optionally further include a negative electrode conductive material and a negative electrode binder.

The negative electrode conductive material is used to impart conductivity to the negative electrode, and may be used as long as it is an electron conductive material without causing chemical change in the battery. Examples of the conductive material may include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

An amount of the negative electrode conductive material may be about 1 wt % to 5 about wt % based on a total weight of the negative active material layer.

The negative electrode binder improves binding properties of negative active material particles with one another and with a current collector. The negative electrode binder may be a non-water-soluble binder, a water-soluble binder, an amphiphilic binder (water-soluble/non-water-soluble binder), or a combination thereof.

The non-water-soluble binder may be polyvinylchloride, carboxylated polyvinylchloride, polyvinylfluoride, polyurethane, polytetrafluoroethylene, polyvinylidene fluoride, polyethylene, polypropylene, polyamideimide, polyimide, or a combination thereof.

The water-soluble binder may be a styrene-butadiene rubber, an ethylene oxide-containing polymer, polyvinylpyrrolidone, acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

The amphiphilic binder may be an acrylated styrene-based rubber.

When the water-soluble binder is used as a negative electrode binder, a cellulose-based compound may be further used to provide viscosity as a thickener. The cellulose-based compound includes one or more of carboxylmethyl cellulose, hydroxypropylmethyl cellulose, methyl cellulose, or alkali metal salts thereof. The alkali metals may be Na, K, or Li. The thickener may be included in an amount of about 0.1 to about 3 parts by weight based on 100 parts by weight of the negative active material.

An amount of the negative electrode binder may be about 1 wt % to about 5 wt % based on a total weight of the negative active material layer.

The negative electrode functional layer is disposed on the negative active material layer, and the negative electrode functional layer includes flake-shaped polyethylene particles.

Figure 2:
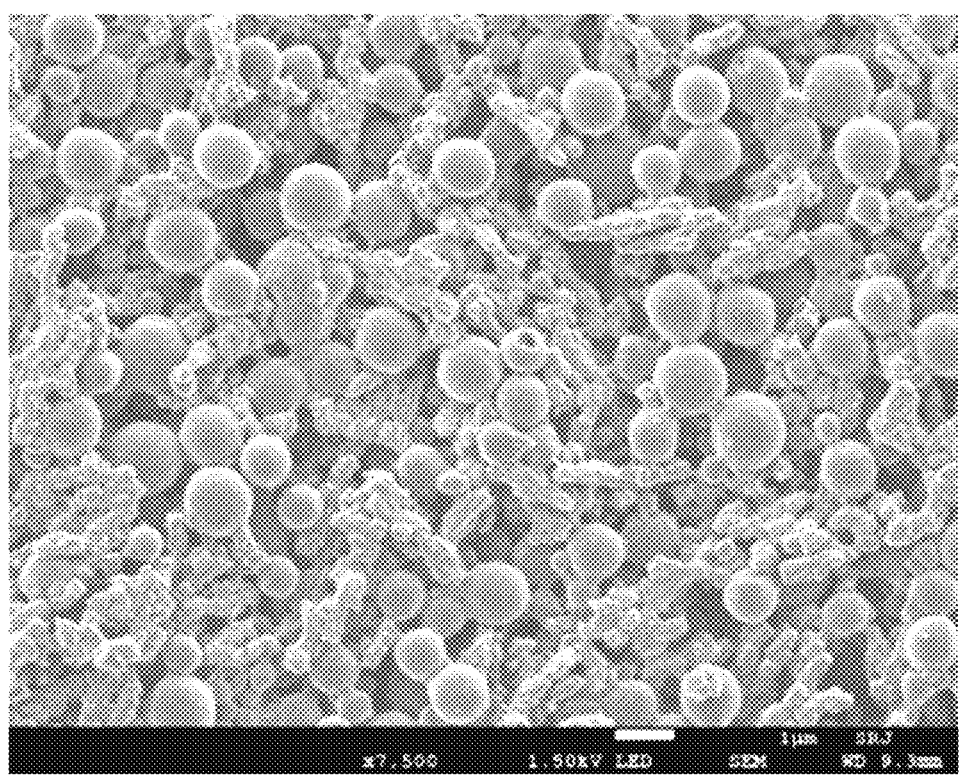
FIG. 2 is a scanning electron micrograph (SEM) of the polyethylene spherical particles in a dispersion state.
Figure 3:
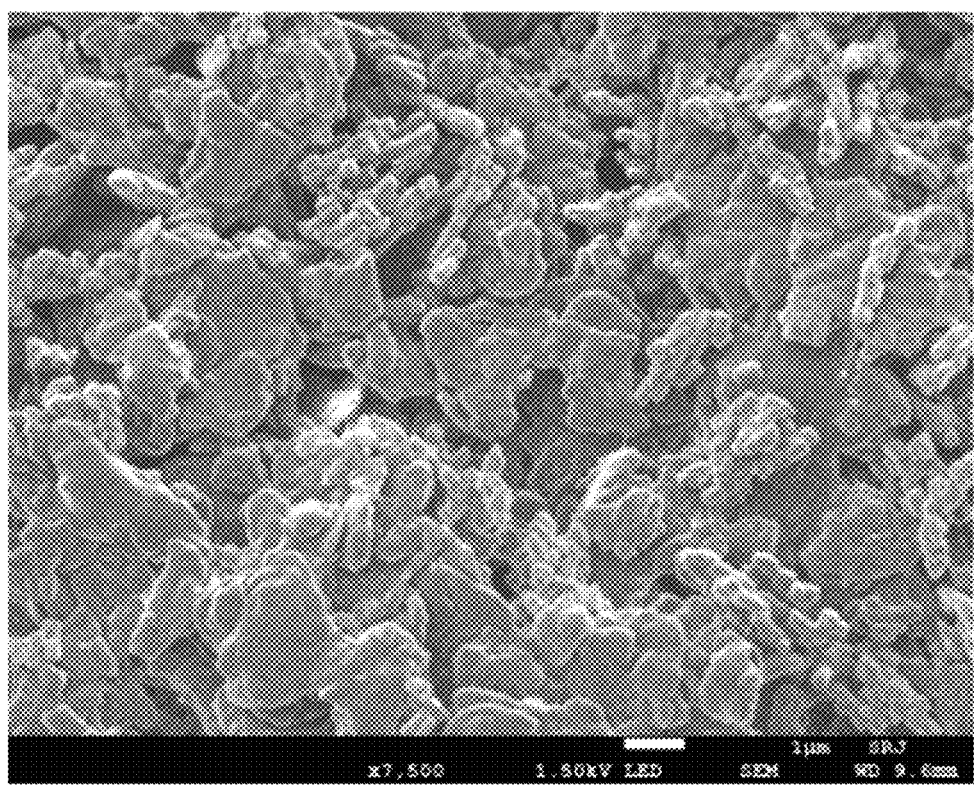
FIG. 3 is a SEM photograph of the flake-shaped polyethylene particles according to Example 1-1.
Figure 4:
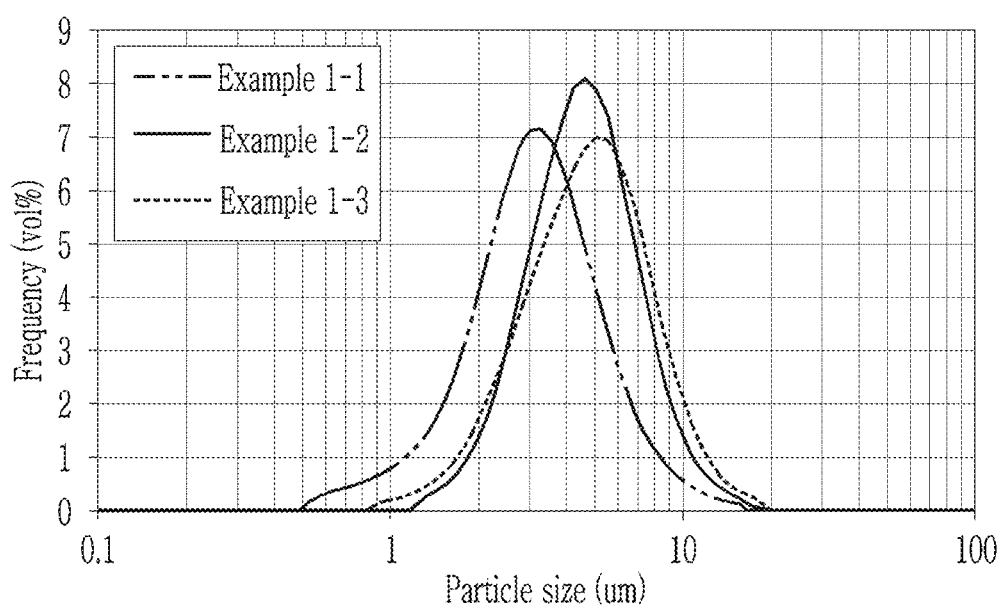
FIG. 4 is a graph analyzing particle size distributions of the flake-shaped polyethylene particles included in the negative electrode functional layer compositions according to Examples 1-1, Examples 1-2, and Examples 1-3.

The shapes of the flake-shaped polyethylene particles are described with reference to FIGS. 2 and 3. FIG. 2 is a scanning electron microscope (SEM) photograph of the polyethylene spherical particles in a dispersion state, and FIG. 3 is an SEM photograph of the flake-shaped polyethylene particles. Referring to FIGS. 2 and 3, the flake-shaped polyethylene particles may have shapes that are significantly different from the spherical polyethylene particles.

Accordingly, when the flake-shaped polyethylene particles of an embodiment are used, a thin and wide functional layer may be formed, compared with spherical shape particles, and there may be a merit of rapidly melting the flake-shaped polyethylene particles and thus blocking an ion passage of a wide area.

The flake-shaped polyethylene particles may have a melting point ($T_m$) of about 90° C. to about 160° C. and, for example, about 110° C. to about 140° C. determinable by differential scanning calorimetry (DSC) according to ISO 11357-3. In addition, the flake-shaped polyethylene particles, for example, may have a weight average molecular weight of about 300 g/mole to about 10,000 g/mole and specifically, about 2,000 g/mole to about 6,000 g/mole. The polyethylene particles having a melting point and a weight average molecular weight within the above-mentioned ranges may shut-down the reaction, before the thermal runaway due to an abnormal operation of the battery, such as internal short-circuit of a battery and the like.

In general, polyethylene may be classified into HDPE (high density polyethylene, density: about 0.94 g/cc to about 0.965 g/cc), MDPE (medium density polyethylene, density: about 0.925 g/cc to about 0.94 g/cc), LDPE (low density polyethylene, density: about 0.91 g/cc to about 0.925 g/cc), VLDPE (very low density polyethylene, density: about 0.85 g/cc to about 0.91 g/cc), and the like. Depending on density, the flake-shaped polyethylene particles may be for example prepared by using the polyethylene polymers such as HDPE, MDPE, and LDPE alone or as a mixture of two or more.

The particle size of the flake-shaped polyethylene particles included in the negative electrode functional layer may be about 1 μm to about 8 μm, and specifically about 2 μm to about 6 μm. On the other hand, a ratio of the long axis length relative to the short axis length of the flake-shaped polyethylene particles may be about 1 through about 5, specifically about 1.1 through about 4.5, for example about 1.2 through about 3.5. In addition, the flake-shaped polyethylene particles may have a thickness of about 0.2 μm to about 4 μm, specifically, about 0.3 μm to about 2.5 μm, or for example, about 0.3 μm to about 1.5 μm. When the flake-shaped polyethylene particles have a size, a ratio of the long axis length relative to the short axis length, and a thickness within the ranges, performance of the battery is secured by minimizing transport resistance of lithium ions, and exothermicity of the battery may be early suppressed by further reinforcing a shut-down function.

The particle size of the flake-shaped polyethylene particle may be an average particle size (D50) at a volume ratio of 50% in a cumulative size-distribution curve.

As used herein, when a definition is not otherwise provided, the average particle size (D50) may be measured by a well-known method for a person of an ordinary skill in the art. For example, it may be measured by a particle size analyzer, or from TEM (transmission electron microscope) or SEM (scanning electron microscope) photographs.

Alternatively, a dynamic light-scattering measurement device is used to perform a data analysis, and the number of particles is counted for each particle size range. From this, the D50 value may be easily obtained through a calculation.

More precisely, the particle size of a flake-shaped polyethylene particle may be determined by a dynamic light-scattering measurement method. Specifically, the size may be measured by ISO 13320 through the analysis of the light-scattering properties of the particles. For the non-spherical particles, a size distribution is reported, where the predicted scattering pattern for the volumetric sum of spherical particles matches the measured scattering pattern.

The negative electrode functional layer includes the flake-shaped polyethylene and optionally, further inorganic particles and a binder. The shut-down function of the flake-shaped polyethylene may early suppress exothermicity of the battery, electrical insulation of the inorganic particles may prevent a short-circuit between the positive and negative electrodes, and the binder may play a role of binding the flake-shaped polyethylene with the inorganic particles and also, binding them to the negative active material layer. Accordingly, physical/thermal safety and stability and room temperature/high temperature cycle-life characteristics of the rechargeable lithium battery may be improved.

The inorganic particles may include, for example, $Al_2O_3$, $SiO_2$, $TiO_2$, $SnO_2$, $CeO_2$, MgO, NiO, CaO, GaO, ZnO, $ZrO_2$, $Y_2O_3$, $SrTiO_3$, $BaTiO_3$, $Mg(OH)_2$, boehmite, or a combination thereof, but are not limited thereto. Organic particles such as an acrylic compound, an imide compound, an amide compound, or a combination thereof may be further included in addition to the inorganic particles, but are not limited thereto.

The inorganic particles may be spherical, sheet-shaped, cubic, or amorphous. The inorganic particles may have an average particle diameter (D50) of about 1 nm to about 2500 nm, for example about 100 nm to about 2000 nm, or about 200 nm to about 1000 nm, or about 300 nm to about 800 nm.

When the negative electrode functional layer further includes the inorganic particles, the flake-shaped polyethylene particles and the inorganic particles may be included in a weight ratio of about 95:5 to about 10:90 and specifically, about 70:30 to about 30:70. When the flake-shaped polyethylene particles and the inorganic particles are used within the ranges, cycle-life characteristics and output characteristics of the battery may be secured.

The binder may be the same as used as a negative electrode binder but is not limited thereto.

When the negative electrode functional layer further includes the inorganic particles and the binder, a sum amount of the flake-shaped polyethylene particles and the inorganic particles over an amount of the binder may be a weight ratio of about 80:20 to about 99:1 and specifically, about 85:15 to about 97:3.

The negative electrode functional layer may have a thickness of about 1 μm to about 10 μm, and specifically about 3 μm to about 10 μm. In addition, a ratio of the thickness of the negative active material layer to the thickness of the negative electrode functional layer may be about 50:1 to about 10:1, and specifically about 30:1 to about 10:1. When the ratio of the thickness of the negative electrode functional layer and the thickness of the negative functional layer is within the above range, physical stability and thermal stability may be significantly improved while maintaining excellent cycle-life characteristics.

The electrolyte solution includes a non-aqueous organic solvent, a lithium salt, and optionally an additive.

The non-aqueous organic solvent serves as a medium for transporting ions taking part in the electrochemical reaction of a battery. The non-aqueous organic solvent according to an embodiment includes a propionate-based solvent and a carbonate-based solvent.

Examples of the carbonate-based solvent include chain carbonates such as dimethyl carbonate (DMC), diethyl carbonate (DEC), dipropyl carbonate (DPC), methylpropyl carbonate (MPC), ethylpropyl carbonate (EPC), methylbutyl carbonate, and methyl ethyl carbonate (MEC) and cyclic carbonates such as ethylene carbonate (EC), propylene carbonate (PC) and butylene carbonate (BC), and the like.

The propionate-based solvent may include at least one of methyl propionate, ethyl propionate, propyl propionate, butyl propionate, and the like.

The non-aqueous organic solvent according to an embodiment may include about 60 volume % to about 80 volume % of the propionate-based solvent and about 20 volume % to about 40 volume % of the carbonate-based solvent, for example, the propionate-based solvent in an amount of greater than or equal to about 60 volume %, greater than or equal to about 61 volume %, greater than or equal to about 62 volume %, greater than or equal to about 63 volume %, greater than or equal to about 64 volume %, greater than or equal to about 65 volume %, greater than or equal to about 66 volume %, greater than or equal to about 67 volume %, greater than or equal to about 68 volume %, greater than or equal to about 69 volume %, or greater than or equal to about 70 volume % and less than or equal to about 80 volume %, less than or equal to about 79 volume %, less than or equal to about 78 volume %, less than or equal to about 77 volume %, less than or equal to about 76 volume %, less than or equal to about 75 volume %, less than or equal to about 74 volume %, less than or equal to about 73 volume %, less than or equal to about 72 volume %, or less than or equal to about 71 volume %, for example, the carbonate-based solvent in an amount of greater than or equal to about 20 volume %, greater than or equal to about 21 volume %, greater than or equal to about 22 volume %, greater than or equal to about 23 volume %, greater than or equal to about 24 volume %, greater than or equal to about 25 volume %, greater than or equal to about 26 volume %, greater than or equal to about 27 volume %, greater than or equal to about 28 volume %, greater than or equal to about 29 volume %, or greater than or equal to about or 30 volume % and less than or equal to about 40 volume %, less than or equal to about 39 volume %, less than or equal to about 38 volume %, less than or equal to about 37 volume %, less than or equal to about 36 volume %, less than or equal to about 35 volume %, less than or equal to about 34 volume %, less than or equal to about 33 volume %, less than or equal to about 32 volume %, or less than or equal to about 31 volume %.

For example, the non-aqueous organic solvent may include ethylene carbonate in amount of about 5 volume % to about 20 volume %, about 7 volume % to about 18 volume %, about 9 volume % to about 16 volume %, or about 11 volume % to about 16 volume %.

The non-aqueous organic solvent may include propylene carbonate in amount of about 5 volume % to about 20 volume %, about 7 volume % to about 18 volume %, about 9 volume % to about 16 volume %, or about 11 volume % to about 16 volume %.

The non-aqueous organic solvent may include ethyl propionate in amount of about 25 volume % to about 50 volume %, about 25 volume % to about 45 volume %, about 25 volume % to about 42 volume %, or about 29 volume % to about 41 volume %.

The non-aqueous organic solvent may include propyl propionate in amount of about 25 volume % to about 50 volume %, about 25 volume % to about 45 volume %, about 25 volume % to about 42 volume %, or about 29 volume % to about 41 volume %.

In general, when an amount of a carbonate-based solvent is increased in an electrolyte solution, viscosity of the electrolyte solution is increased and thus, capacity characteristics of a battery may be deteriorated, while when an amount of a propionate-based solvent is increased in the electrolyte solution, a dissociation degree of an electrolyte salt is decreased and thus capacity characteristics or cycle-life characteristics may be deteriorated. Particularly, as for a rechargeable battery including a negative electrode functional layer according to an embodiment, since a lithium passage is limited during the normal operation of the battery, impregnation of an electrolyte solution may be deteriorated, but when the propionate-based solvent and the carbonate-based solvent are included within the ranges, the viscosity of the electrolyte solution and the dissociation degree of the electrolyte salt may be appropriately adjusted and thus the impregnation of the electrolyte solution may be improved and resultantly, the capacity characteristics and the cycle-life characteristics of the battery may be improved.

The non-aqueous organic solvent according to an embodiment may further include an organic solvent in addition to the carbonate-based solvent and propionate-based solvent.

The organic solvent may be, for example, an ester-based, ether-based, ketone-based, alcohol-based, or aprotic solvent. The ester-based solvent may include methyl acetate, ethyl acetate, n-propyl acetate, dimethylacetate, methylpropionate, γ-butyrolactone, decanolide, valerolactone, mevalonolactone, caprolactone, and the like. The ether-based solvent may include dibutyl ether, tetraglyme, diglyme, dimethoxyethane, 2-methyltetrahydrofuran, tetrahydrofuran, and the like and the ketone-based solvent may be cyclohexanone, and the like. The alcohol-based solvent may include ethanol, isopropyl alcohol, and the like, and the aprotic solvent may include nitriles such as R—CN (wherein R is a C2 to C20 linear, branched, or cyclic hydrocarbon group, a double bond, an aromatic ring, or an ether bond), and the like, amides such as dimethyl formamide, and the like, dioxolanes such as 1,3-dioxolane, and the like, sulfolanes, and the like.

These organic solvents may be used alone or in combination of two or more, and in the case of mixing two or more, the mixing ratio may be appropriately adjusted according to the desired battery performance, which is widely understood by those skilled in the art.

The non-aqueous organic solvent according to an embodiment may further include an aromatic hydrocarbon-based organic solvent in addition to the propionate-based solvent and carbonate-based solvent. In this case, a sum amount of the propionate-based solvent and the carbonate-based solvent and the aromatic hydrocarbon-based organic solvent may be mixed in a volume ratio of about 1:1 to about 30:1.

As the aromatic hydrocarbon-based organic solvent, an aromatic hydrocarbon-based compound represented by Chemical Formula 2 may be used.

[Chemcical Formula 2]

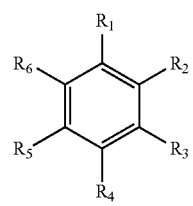

wherein $R_1$ to $R_6$ are the same or different and are selected from hydrogen, a halogen, a C1 to C10 alkyl group, a haloalkyl group, and a combination thereof.

Specific examples of the aromatic hydrocarbon-based organic solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

Lithium salt may be used as a non-aqueous electrolyte of a rechargeable lithium battery. The lithium salt dissolved in an organic solvent supplies a battery with lithium ions, basically operates the rechargeable lithium battery, and improves transportation of the lithium ions between positive and negative electrodes.

Examples of the lithium salt include at least one supporting salt selected from LiPF6, LiBF4, LiSbF6, LiAsF6, LiN(SO2C2F5)2, Li(CF3SO2)2N, LiN(SO3C2F5)2, Li(FSO2)2N (lithium bis(fluorosulfonyl)imide: LiFSI), LiC4F9SO3, LiClO4, LiAlO2, LiAlCl4, LiN(CxF2x+1SO2)(CyF2y+1SO2) (wherein, x and y are natural numbers), LiCl, LiI, and LiB(C2O4)2 (lithium bis(oxalato) borate; LiBOB).

A concentration of the lithium salt may range from about 0.1 M to about 2.0 M. When the lithium salt is included at the above concentration range, an electrolyte may have excellent performance and lithium ion mobility due to optimal electrolyte conductivity and viscosity.

The electrolyte solution may further include a vinylene carbonate, an ethylene carbonate-based compound of Chemical Formula 3, a nitrile-based compound, or a combination thereof as an additive to improve cycle-life of a battery.

[Chemical Formula 3]

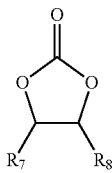

wherein R7 and R8 may be the same or different and may be selected from hydrogen, a halogen group, a cyano group (CN), a nitro group (NO2), and a fluorinated C1 to C5 alkyl group, wherein at least one of R7 and R8 is selected from a halogen group, cyano group (CN), nitro group (NO2), and a fluorinated C1 to C5 alkyl group, provided that R7 and R8 are not both hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like.

Examples of the nitrile compounds may include glutanonitrile (GN), succinonitrile (SN), adiponitrile (AN), 3,3'-thio-dipropionitrile (TPN), 1,2,3-hexanetricarbonitrile, 1,2,4-hexanetricarbonitrile, 1,2,5-hexanetricarbonitrile, 1,2,6-hexanetricarbonitrile, 1,3,4-hexane tricarbonitrile, 1,3,5-hexanetricarbonitrile, 1,3,6-hexanetricarbonitrile, and 1,4,5-hexanetricarbonitrile.

In the case of further using such cycle-life improving additives, the amount thereof may be appropriately adjusted. It may be, for example, included in an amount of about 3 wt % to about 20 wt %, or about 5 wt % to about 18 wt % based on a total weight of the electrolyte solution.

The separator 113 may be disposed between the positive electrode 114 and the negative electrode 112. The separator 113 may be, for example, selected from a glass fiber, polyester, polyethylene, polypropylene, polytetrafluoroethylene, or a combination thereof. It may have a form of a non-woven fabric or a woven fabric. For example, in a rechargeable lithium battery, a polyolefin-based polymer separator such as polyethylene and polypropylene is mainly used. In order to ensure the heat resistance or mechanical strength, a coated separator including a ceramic component or a polymer material may be used. Optionally, it may have a mono-layered or multi-layered structure.

Hereinafter, the above aspects of the present disclosure are illustrated in more detail with reference to examples. However, these examples are exemplary, and the present disclosure is not limited thereto.

EXAMPLES

Example 1-1

LiCoO2 and LiFePO4 were mixed in a weight ratio of 9:1 to prepare a positive active material, and 95 wt % of the positive active material, 3 wt % of a polyvinylidene fluoride binder, and 2 wt % of a ketjen black conductive material were mixed in an N-methylpyrrolidone solvent to prepare positive active material slurry. The positive active material slurry was coated both surfaces of an aluminum current collector and then, dried and compressed to manufacture a positive electrode having a positive active material layer.

98 wt % of artificial graphite, 0.8 wt % of carboxylmethyl cellulose, and 1.2 wt % of a styrene-butadiene rubber were mixed in pure water to prepare negative active material slurry. The negative active material slurry was coated on both surfaces of a copper current collector and then, dried and compressed to manufacture a negative electrode having a negative active material layer.

48 wt % of flake-shaped polyethylene (PE) particles (an average particle diameter (D50): 2 μm, a long axis length/a short axis length: about 2, a thickness: about 0.6 μm), 47 wt % of alumina (an average particle diameter: 0.7 μm), and 5 wt % of an acrylated styrene-based rubber binder were mixed in an alcohol-based solvent to prepare a negative electrode functional layer composition.

On the surface of the negative electrode, the negative electrode functional layer composition was coated and then, dried and compressed to manufacture a negative electrode having a negative electrode functional layer.

The positive electrode, a polyethylene (PE)/polypropylene (PP) multi-layered separator, and the negative electrode having a coating layer including the flake-shaped PE particles were sequentially stacked to manufacture an electrode assembly, and an electrolyte solution was injected thereinto to manufacture a rechargeable lithium battery cell.

The electrolyte solution was prepared by mixing ethylene carbonate (EC):propylene carbonate (PC):ethyl propionate (EP):propyl propionate (PP) in a volume ratio of 10:10:40:40, adding 1.0 M of electrolyte LiFP6 thereto, and then, adding 3 wt % of fluoroethylene carbonate (FEC), 1 wt % of vinylene carbonate (VC), and 2 wt % of succinonitrile (SN) thereto based on a total weight of the electrolyte solution.

Example 1-2

A rechargeable lithium battery cell was manufactured according to the same method as Example 1-1 except that flake-shaped PE particles (an average particle diameter: 4 μm, a long axis length/a short axis length: about 2.4, a thickness: about 0.6 μm) instead of the flake-shaped polyethylene (PE) particles of Example 1-1 (an average particle diameter (D50): 2 μm, a long length axis length/a short axis length: about 2, a thickness: about 0.6 μm) were used to form a negative electrode functional layer.

Example 1-3

A rechargeable lithium battery cell was manufactured according to the same method as Example 1-1 except that flake-shaped PE particles (an average particle diameter: 6 μm, a long axis length/a short axis length: about 2.4, a thickness: about 0.6 μm) instead of the flake-shaped polyethylene (PE) particles of Example 1-1 (an average particle diameter (D50): 2 μm, a long axis length/a short axis length: about 2, a thickness: about 0.6 μm) were used to form a negative electrode functional layer.

Examples 2-1 Through 2-3

Rechargeable lithium battery cells were manufactured respectively in the same method as Examples 1-1 to 1-3 except that EC:PC:EP:PP were mixed in a volume ratio of 15:15:30:40 instead of the solvents of Examples 1-1 to 1-3.

Examples 3-1 Through 3-3

Rechargeable lithium battery cells were manufactured respectively in the same method as Examples 1-1 to 1-3 except that a solvent prepared by mixing EC:PC:EP:PP in a volume ratio of 20:20:30:30 was used instead of the solvents of Examples 1-1 to 1-3.

Comparative Example 1

A rechargeable lithium battery cell was manufactured in the same method as Example 1-1 except that a solvent prepared by mixing EC:EMC:DEC in a volume ratio of 30:50:20 was used instead of the solvent of Example 1-1.

Comparative Example 2

A rechargeable lithium battery cell was manufactured in the same method as Example 1-1 except that a solvent prepared by mixing EC:EP in a volume ratio of 50:50 was used instead of the solvent of Example 1-1.

Comparative Example 3

A rechargeable lithium battery cell was manufactured in the same method as Example 1-1 except that a solvent prepared by mixing EC:PC:EP:PP in a volume ratio of 20:30:25:25 was used instead of the solvent of Example 1-1.

Comparative Example 4

A rechargeable lithium battery cell was manufactured in the same method as Example 1-1 except that a solvent prepared by mixing EC:PC:EP:PP in a volume ratio of 5:5:45:45 was used instead of the solvent of Example 1-1.

Comparative Example 5

A rechargeable lithium battery cell was manufactured respectively in the same method as Example 1-1 except that the negative electrode functional layer was not included in a negative electrode.

Evaluation Examples

Impregnation Properties of Electrolyte Solution

The negative electrode plates according to Examples 1-1 to 1-3, 2-1, and 3-1 and Comparative Examples 1 to 4 were respectively cut into a size of 3 cm×6 cm and then, dipped into each electrolyte solution prepared respectively in examples and comparative examples for 300 seconds, and then, amounts of the electrolyte solutions impregnated into the negative electrodes were measured in a quantitative method. The results are shown in Table 1. The measurement was performed by using Attension Sigma equipment.

TABLE 1

|  | Solvent composition of electrolyte solution ($LiFP_6$ 1.0M) | Impregnation properties of electrolyte solution (300 sec, g) |
|---|---|---|
| Example 1-1 | EC:PC:EP:PP = 10:10:40:40 | 0.0139 |
| Example 1-2 | EC:PC:EP:PP = 10:10:40:40 | 0.0137 |
| Example 1-3 | EC:PC:EP:PP = 10:10:40:40 | 0.0138 |
| Example 2-1 | EC:PC:EP:PP = 15:15:30:40 | 0.0138 |
| Example 3-1 | EC:PC:EP:PP = 20:20:30:30 | 0.0135 |
| Comp. Ex. 1 | EC:EMC:DEC = 30:50:20 | 0.0117 |
| Comp. Ex. 2 | EC:EP = 50:50 | 0.0156 |
| Comp. Ex. 3 | EC:PC:EP:PP = 20:30:25:25 | 0.0122 |
| Comp. Ex. 4 | EC:PC:EP:PP = 5:5:45:45 | 0.0149 |

Referring to Table 1, the negative electrodes of Examples 1-1 to 1-3, 2-1, and 3-1 maintained impregnation properties in the electrolyte solutions within an appropriate range, compared with those of Comparative Examples 1 to 4.

Cycle-Life Characteristics of Room Temperature/High Temperature

The rechargeable lithium battery cells of Examples 1-1 to 1-3, 2-1 to 2-3, and 3-1 to 3-3 and Comparative Examples 1 to 4 were respectively charged at 4.4 V at a 0.5 C/0.5 C rate at room temperature (25° C.) and a high temperature 45° C., respectively and then discharged down to 3.0 V, which was regarded as one cycle and repeated up to 300 cycles, and then, capacity retentions of the battery cells were measured. The results are shown in Table 2.

TABLE 2

| | Cycle Capacity Retention | |
|---|---|---|
| | Room temperature (25° C., 300th cycle, %) | High temperature (45° C., 300th cycle, %) |
| Example 1-1 | 88.6 | 92.7 |
| Example 1-2 | 88.5 | 92.8 |
| Example 1-3 | 88.6 | 92.7 |
| Example 2-1 | 91.8 | 92.8 |
| Example 2-2 | 91.8 | 92.7 |
| Example 2-3 | 91.7 | 92.7 |
| Example 3-1 | 86.5 | 86.5 |
| Example 3-2 | 86.7 | 86.4 |
| Example 3-3 | 86.5 | 86.5 |
| Comp. Ex. 1 | 81.1 | 83.7 |
| Comp. Ex. 2 | 83.4 | 85.8 |

TABLE 2-continued

| | Cycle Capacity Retention | |
|---|---|---|
| | Room temperature (25° C., 300th cycle, %) | High temperature (45° C., 300th cycle, %) |
| Comp. Ex. 3 | 86.2 | 86.3 |
| Comp. Ex. 4 | 86.2 | 85.7 |

Referring to Table 2, the rechargeable lithium battery cells of Examples 1-1 to 1-3, 2-1 to 2-3, and 3-1 to 3-3 exhibited excellent room temperature and high temperature capacity retentions after the 300 cycles compared with those of Comparative Examples 1 to 4. Particularly, Comparative Examples 2 and 4 that included an excessive amount of the propionate-based solvent in the organic solvent exhibited a decreased dissociation degree of an electrolyte salt and thus deterioration of room temperature/high temperature capacity retentions, but Comparative Examples 1 and 3 that included an excessive amount of the carbonate-based solvent in the organic solvent exhibited a viscosity increase of the electrolyte solutions and impregnation deterioration thereof and thus insufficient capacity characteristics and capacity retention. On the other hand, Examples 1-1 to 1-3 and 2-1 to 2-3 including the propionate-based solvent and the carbonate-based solvent within the preferable ranges exhibited much improved capacity retentions.

Safety Evaluation of Rechargeable Lithium Battery Cells

Penetration, dropping, and collision tests of the rechargeable lithium battery cells manufactured in Example 1-1 and Comparative Example 5 were conducted, and the results of evaluating physical safety are shown in Table 3. On the other hand, the physical safety evaluation criteria are as described in Table 4.

TABLE 3

| | Penetration | Dropping | Collision |
|---|---|---|---|
| Example 1-1 | L2 | L2 | L2 |
| Comp. Ex. 5 | L5 | L4 | L5 |

TABLE 4

| Level criteria | Occurrence |
|---|---|
| L0 | No occurrence |
| L1 | Leakage, outside temperature <150° C. |
| L2 | Outside temperature <200° C. |
| L3 | Smoke, outside temperature >200° C. |
| L4 | Flame |
| L5 | Explosion |

Referring to Tables 3 and 4, the rechargeable lithium battery cell of Example 1-1 was effectively suppressed from an ion passage during the thermal runaway due to a physical impact and expected to be early shut down and in addition, exhibited excellent physical safety, compared with the rechargeable lithium battery cell of Comparative Example 5. Resultantly, the rechargeable lithium battery cells according to an embodiment may effectively realize a shut-down function as well as maintain excellent battery characteristics.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A rechargeable lithium battery, comprising:
    a negative electrode, comprising:
        a negative active material layer; and
        a negative electrode functional layer disposed on the negative active material layer;
    a positive electrode, comprising:
        a positive active material; and
    an electrolyte solution,
    wherein the negative electrode functional layer comprises:
        flake-shaped polyethylene particles,
    wherein the electrolyte solution comprises:
        a lithium salt; and
        a non-aqueous organic solvent, and
    wherein the non-aqueous organic solvent comprises:
        about 60 volume % to about 80 volume % of a propionate-based solvent; and
        about 20 volume % to about 40 volume % of a carbonate-based solvent.

2. The rechargeable lithium battery of claim 1, wherein the propionate-based solvent comprises: at least one selected from methyl propionate, ethyl propionate, propyl propionate, and butyl propionate.

3. The rechargeable lithium battery of claim 1, wherein the carbonate-based solvent comprises: at least one selected from ethylene carbonate, propylene carbonate, butylene carbonate, fluoroethylene carbonate, dimethyl carbonate, methyl ethyl carbonate, diethyl carbonate, methylpropyl carbonate, and methylbutyl carbonate.

4. The rechargeable lithium battery of claim 1, wherein the electrolyte solution comprises an additive,
    wherein the additive is included in an amount of about 3 wt % to about 20 wt % based on a total amount of the electrolyte solution.

5. The rechargeable lithium battery of claim 1, wherein the flake-shaped polyethylene particles have a particle size of about 1 μm to about 8 μm.

6. The rechargeable lithium battery of claim 1, wherein a ratio of the long axis length relative to the short axis length of the flake-shaped polyethylene particles is about 1 through about 5.

7. The rechargeable lithium battery of claim 1, wherein the flake-shaped polyethylene particles have a thickness of about 0.2 μm to about 4 μm.

8. The rechargeable lithium battery of claim 1, wherein the negative electrode functional layer optionally further comprises:
    inorganic particles; and
    a binder.

9. The rechargeable lithium battery of claim 8, wherein a sum amount of the flake-shaped polyethylene particles and an amount of the inorganic particles over the binder are a weight ratio of about 80:20 to about 99:1.

10. The rechargeable lithium battery of claim 8, wherein the flake-shaped polyethylene particles and the inorganic particles are included in a weight ratio of 95:5 to 10:90.

11. The rechargeable lithium battery of claim 1, wherein the negative electrode functional layer has a thickness of about 1 μm to about 10 μm.

12. The rechargeable lithium battery of claim 1, wherein a ratio between thicknesses of the negative active material layer and the negative electrode functional layer is about 50:1 to about 10:1.

13. The rechargeable lithium battery of claim 1, wherein the positive active material layer comprises:
a first positive active material comprising:
at least one of a composite oxide of metal selected from cobalt, manganese, nickel, and a combination thereof; and
lithium; and
a second positive active material comprising:
a compound represented by Chemical Formula 1

$$Li_aFe_{1-x}M_xPO_4 \qquad \text{[Chemical Formula 1]}$$

wherein, in Chemical Formula 1, $0.90 \le a \le 1.8$, $0 \le x \le 0.7$, and M is Mn, Co, Ni, or a combination thereof.

14. The rechargeable lithium battery of claim 13, wherein the first positive active material comprises: one of $LiCoO_2$, $Li_bM^1_{1-y1-z1}M^2_{y1}M^3_{z1}O_2$ ($0.9 \le b \le 1.8$, $0 \le y1 \le 1$, $0 \le z1 \le 1$, $0 \le y1+z1 \le 1$, $M^1$, $M^2$, and $M^3$ are independently a metal of Ni, Co, Mn, Al, Sr, Mg, or La), and a combination thereof.

15. The rechargeable lithium battery of claim 13, wherein the second positive active material comprises $LiFePO_4$.

16. The rechargeable lithium battery of claim 13, wherein the positive active material layer further comprises:
a positive electrode functional layer disposed on the positive active material layer.

17. The rechargeable lithium battery of claim 16, wherein
the first positive active material is included in the positive active material layer, and
the second positive active material is included in at least one of the positive active material layer and the positive electrode functional layer.

18. The rechargeable lithium battery of claim 13, wherein the first positive active material and the second positive active material are included in a weight ratio of about 97:3 to about 80:20.

19. The rechargeable lithium battery of claim 13, wherein the first positive active material is included in an amount of about 70 wt % to about 99 wt % based on a total amount of the positive active material layer, and
the second positive active material is included in an amount of about 1 wt % to about 30 wt % based on a total amount of the positive active material layer.

20. The rechargeable lithium battery of claim 1, wherein the flake-shaped polyethylene particles have a melting point of between 90° C. and 160° C. and a weight average molecular weight of between 300 g/mole to 10,000 g/mole.

* * * * *